INVENTOR.
William Hayes
by
Walter F Kaufman

Patented Jan. 24, 1950

2,495,253

UNITED STATES PATENT OFFICE 2,495,253

METHOD AND APPARATUS FOR FORMING ARTICLES OF HOLLOW GLASSWARE

William Hayes, Millville, N. J., assignor to Armstrong Cork Company, Lancaster, Pa., a corporation of Pennsylvania Application March 14, 1945, Serial No. 582,730

6 Claims. (Cl. 49—18)

This invention relates to a method and apparatus for forming articles of hollow glassware and more particularly to an apparatus for supplying cooling fluid to the outside surface of a substantially completely formed neck finish of a glass jar during mold formation.

The invention finds particular usefulness in the manufacture of glass jars having a surface finish which is adapted for receiving a side seal type of closure. With such jars, it is important to maintain concentricity in the neck finish at the outer sealing surface particularly, and any tendency toward distortion must be obviated if satisfactory ware is to be produced which will properly accommodate the side seal closure to be applied to it.

It is an object of my invention to provide a method and apparatus which will make possible the production of hollow glass articles having properly formed necks substantially free of distortion due to sagging. A further object of my invention is to provide a method and apparatus whereby the speed of manufacturing hollow molded articles and particularly those requiring a precise neck finish may be increased.

In the manufacture of containers to receive side seal closures, such as the closure disclosed in White Patent No. 2,339,827, a gob of glass is disposed in a parison or blank mold and in this blank mold the neck finish is substantially completely formed. The parison of glass with its substantially completely formed neck finish is mechanically transferred from the parison or blank mold to a blow mold. In the blow mold, the formed upper portion of the neck finish is disposed above the upper surface of the blow mold. Blowing fluid such as compressed air or steam under pressure is applied to the glass parison in the blow mold and is effective for blowing the parison into the desired formed article. The blowing fluid is applied continuously to the parison during the blowing operation and is generally fed into the parison through a blow tube disposed at a point substantially below the open end of the glass parison at the neck finish. The air is exhausted continuously from the mold through a venting port in the blow head. It is necessary in bottle blowing to reduce the mass of glass from the gob temperature which may be in excess of 2210° F. to a temperature where the article will be self-supporting upon removal; this is generally in the order of 1250° F. The neck finish is always at a relatively lower temperature than the main body of the glass parison when the parison is transferred from the blank mold to the blow mold but there is nevertheless the problem of sagging and distortion of the neck finish. As a result, the speed of the blowing machines has always been limited by this factor since there is a minimum extraction of heat from the neck finish which must be accomplished prior to removal of the completed article from the blow mold if distortion is to be eliminated.

According to my invention the blowing fluid upon passing from within the article being blown is caused to circulate into contact with the outer surface of the neck finish prior to discharge of the fluid to the atmosphere. Thus, the fluid which is effective for blowing the bottle to shape serves also to extract heat from the outer surface of the article adjacent the neck finish and, since heat extraction from such surface must be accomplished prior to removal, the speed of operation of the blowing machines may be increased in accordance with any increase in the speed of heat extraction from the neck finish.

In order that my invention may be more readily understood, I will describe the same in connection with the attached drawings in which Figure 1 is a sectional view of a blow mold and blow head construction incorporating the present invention;

Figure 1:
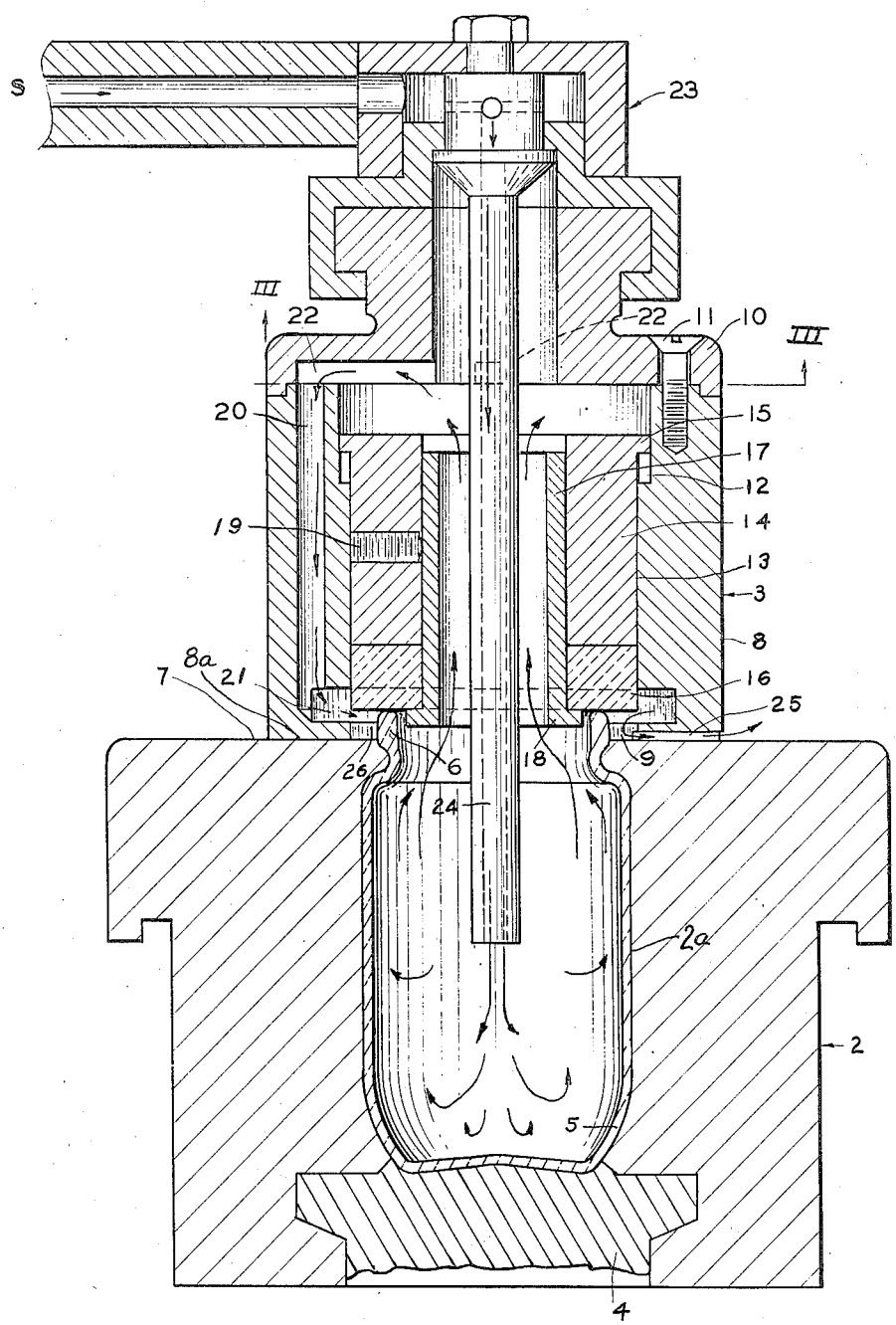

The mechanism shown in Figure 1 is designed specifically for use with a Hartford-Empire Individual Section machine, but it will be clear from the description which follows that the same general arrangement may be employed for other types of machines useful for forming articles of hollow glassware. In the embodiment illustrated in the drawings, the article being formed is a small jar of the type known as G. C. A. 1710 finish which is adapted to receive a side seal closure and is commonly used for the packaging of baby foods. It will be clear that the invention is not limited to the formation of any particular article of hollow glassware but, as pointed out above, there are particular advantages which flow from using the method and apparatus of this invention in the formation of hollow glass jars requiring an outside neck finish held within close tolerance limits.

The essential elements of the combination are a blow mold 2 having a mold opening 2a therein and a blow head 3. The blow mold 2 has a bottom plate 4 which generally includes the trademark of the manufacturer, the jar number, and sometimes identifying indicia of the customer for whom the jar is produced. Any conventional blow mold may be used, and for that reason a detailed description of the mold is not necessary.

In Figure 1, a jar 5 is shown in completely blown form ready for removal from the blow mold. It will be noted that the jar 5 closely conforms to the contour of the mold except that the neck portion 6 thereof extends above the upper surface 7 of the blow mold. The portion 6 is formed in the parison mold and as disposed in the blow mold is substantially completely formed prior to blowing the glass parison to final form.

The blow head 3 includes a bell 8 which is adapted to be brought to a position with its lower surface 8a in engagement with the upper surface 7 of the blow mold 2, with a central opening 9 of the bell surrounding the neck 6 of the glass parison in the blow mold. The bell 8 is attached to an adaptor 10 by means of machine screws 11. The particular adaptor shown in Figure 1 is for a Hartford-Empire I S machine. The shape and design of the adaptor will vary depending upon the type of machine to which the blow head is attached for use. The bell 8 is counterbored as indicated at 12 and is provided with a central bore 13 in which there is disposed for sliding movement a sleeve 14 which is shouldered at 15 to move within the counterbore 12. Downward movement of the sleeve 14 is limited by engagement of the shoulder 15 with the body of the bell 8 at the base of the counterbore 12. A finish-sealing ring 16 is provided on the end of the sleeve 14. This sealing ring 16 is preferably formed of asbestos cement composition of the type known as "Transite Board." Other materials may be used for this purpose—in fact, cast iron sealing rings are frequently employed. The ring 16 is held in place by a collar 17 having a radially outwardly directed shoulder 18 which lies beneath the ring 16. The collar 17 is secured to the sleeve 14 by means of a set screw 19 which is threaded into the sleeve 14 and engages the collar 17.

Figure 2:
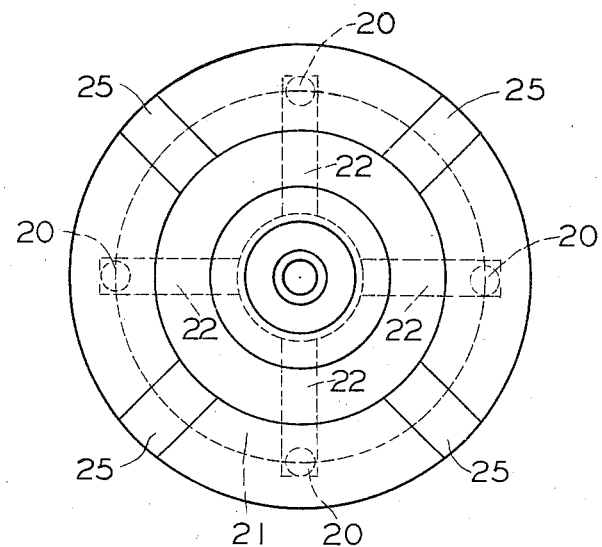
Figure 2 is a bottom plan view of the blow head of Figure 1.
Figure 3:
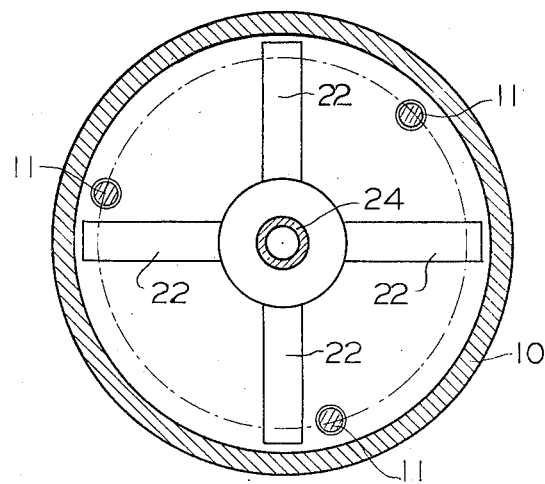
Figure 3 is a sectional view of the blow head adaptor shown in Figure 1 and taken on the line III—III thereof.

The bell 8 is provided with one or more vertical passageways 20. In the embodiment illustrated, four such passageways have been incorporated. Their location is best shown in Figure 2. The passageways 20 are preferably formed by drilling from the upper surface of the bell 8 downward to a point closely adjacent the base of the bell. An annular recess 21 is provided in the base of the bell and intersects the passageways 20 about midway of their diameters as indicated by the dotted line in Figure 2 and as shown in the left-hand portion of Figure 1. The adaptor 10 is provided with one or more radial passageways 22 which communicate with the vertical passageways 20, one such passageway 22 being provided for each vertical passageway 20.

Conventional mechanism for connecting the blow head with a source of blowing fluid is indicated at 23 in Figure 1. Any suitable equipment for this purpose may be used. It will not be described in detail for the design of this equipment is not essential to the present invention. Any arrangement for supplying blowing fluid will be acceptable, although it is preferred to incorporate a blow tube 24 which assumes a position within the glass parison at the time blowing fluid is admitted to the parison to effect blowing. The mechanism 23 is sealed so that the blowing fluid admitted from the source S may be discharged only through the tube 24 and exhaustion to atmosphere through the adaptor 10 or connector 23 is prevented.

The bell 8 is provided with one or more exhaust ports 25 which communicate with the recess 21. As shown in Figure 2, four such ports 25 are provided and they are spaced circumferentially from the passageways 20 so that the blowing fluid moving through the passageways 20 into the recess 21 must pass therealong prior to discharge through a discharge port 25.

In the operation of my device, the parison is transferred to the blow mold 2 in the customary manner. The blow head 3 is then brought down over the neck 6 of the glass parison. The upper edge of the finish 6 is engaged by the sealing ring 16 and, as downward movement of the blow head continues, the sleeve 14 and its associated mechanism is displaced with respect to the bell 8, moving upwardly in the counterbore 12. This arrangement permits the use of the same blow head for different sizes of blow molds where the height of the neck finish 6 above the surface 7 of the blow mold may vary. It also provides for allowable tolerances in the neck finish height. The weight of the sleeve 14 and its associated mechanism is not great and since it slides freely within the bore 13 and the counterbore 12, there is no substantial pressure applied to the neck finish which might result in distortion of it. Downward movement of the blow head 3 is continued until the bell 8 lies firmly in engagement with the surface 7 of the blow mold 2. The blowing fluid is then admitted through the tube 24 and the jar 5 is blown to the shape shown in Figure 1. The fluid which is fed through the blow tube 24 is confined by the sealing ring 16 against movement radially outwardly but is free to move upwardly within collar 17, between it and the tube 24, and thence radially through passageways 22 and 20 to the annular recess 21 which surrounds the neck 6. It will be noted by referring to Figure 1 that a chamber 26 is formed surrounding the neck 6, said chamber having walls constituted of the sealing ring 16 which engages the upper lip of the jar 5, the upper surface 7 of the blow mold 2, and the bell 8. The blowing fluid circulates in this chamber 26 in free engagement with the exposed outer surface of the finish 6 and is effective for extracting heat therefrom. The blowing fluid is then exhausted through the ports 25 to the atmosphere.

By this method, blowing fluid is continuously supplied to the parison as the jar or other article is being formed and, at the same time, the outer surface at the neck finish is being bathed with the blowing fluid discharged from the article. This effectively cools the neck surface and permits rapid removal of the article from the mold without the presence of sagging or other distortion in the neck finish.

By my method and with my apparatus, the speed of manufacture of hollow glass articles has been materially increased without sacrificing the quality of the article. In fact, with my invention it is possible to increase the mold temperature and thus improve the quality of the blown ware, while at the same time accomplishing blowing in a shorter period of time, for the critical limitation in the manufacture of hollow articles, particularly those having sealing surfaces on the outer neck finish, is to rapidly and effectively cool such surface to prevent distortion while at the same time maintaining relatively high mold temperatures to effect good formation and glass distribution in the blowing operation. This same problem is involved in the manufacture of other glass containers; those, for example, having a top seal. In fact, my invention is useful in the manufacture of many sorts of hollow glass articles and is not limited to use with molds for making side seal or top seal glass containers.

While I have illustrated and described certain preferred embodiments of my invention, it will be understood that the invention is not limited thereto but may be otherwise embodied and practiced within the scope of the following claims.

I claim:

1. In an apparatus for forming articles of hollow glassware, the combination with a blow mold having a mold opening for the reception of a parison to be blown, with the upper portion of the finish disposed exteriorly of said mold, of a bell adapted to engage said glow mold surrounding said opening, means engageable with the upper edge of said finish to seal the parison against radial displacement of blowing fluid therefrom, the bell and the finish engaging means together with the blow mold constituting a chamber disposed radially of the mold opening for the reception of cooling fluid to be directed against the outer surface of the finish of said parison, means for directing fluid into said parison to blow the same and means for directing spent fluid from the parison to said chamber.

2. In an apparatus for forming articles of hollow glassware, the combination of a blow mold and a blow head, said blow head comprising a bell engageable with said blow mold surrounding a mold opening in said blow mold, a blow tube extending through said bell into said mold opening, a sleeve moveable axially within a bore in said bell, a finish sealing ring associated with said sleeve and moveable therewith to engage the lip of a hollow glass article disposed within said blow mold, a chamber defined by said sealing ring, blow mold and bell, said chamber surrounding said mold opening, a passageway leading from said mold opening between said blow tube and sleeve, a vertical passageway connecting said passageway leading from the mold opening and said chamber, and a vent passageway extending from said chamber for the discharging of fluid therefrom.

3. In an apparatus for forming articles of hollow glassware, a blow head comprising a bell having a recess therein adjacent the open end thereof, a sleeve slidable within said bell and displaceable upwardly within said bell upon engagement of said sleeve with the lip of a hollow glass article to be blown, a blow tube extending through a central opening in said bell, a plurality of vertical passageways extending through said bell and terminating in said recess, and a plurality of radial passageways connecting the vertical passageways with the central opening in said bell.

4. In an apparatus for forming articles of hollow glassware, a blow head comprising a bell having a lower surface, a blow tube extending into said bell, a sleeve slidable within a central opening in said bell, a sealing ring associated with said sleeve for engagement with the lip of a hollow article to be blown, a collar secured to said sleeve and holding said sealing ring with respect to said sleeve, a plurality of vertical passageways in said bell connecting with an annular recess formed in the bell adjacent the open end thereof, a plurality of radial passageways connecting said vertical passageways with said central opening, and discharge ports offset from said vertical passageways and formed in the lower surface of said bell and in open communication with said recess.

5. In a method of blowing a parison of glass to final form, said parison having a substantially completely formed neck finish, the steps comprising directing a stream of blowing fluid into an opening in said parison, sealing the lip of the neck finish against radial discharge of blowing fluid from said parison and maintaining a circulation of flowing fluid exhausted from the parison surrounding and bathing the outer surface of the substantially completely formed neck finish while continuing the application of glowing fluid to said parison until the final article has been formed.

6. In an apparatus for forming articles of hollow glassware, the combination of a blow mold and a blow head, said blow mold comprising a mold body having a mold opening therein in which the article to be formed is blown, said blow head comprising a bell engageable with said blow mold surrounding the exposed end of said mold opening and defining with said blow mold a chamber for the movement of fluid therethrough and into engagement with the outer surface of an article disposed in said blow mold, annular means slidable within a bore in said bell and having an annular surface for sealing the lip of an article disposed within said blow mold, means passing through said bell and entering said mold opening for direction blowing fluid into said article disposed within said mold to be blown, and a passageway connecting said chamber with the mold for the direction of spent blowing fluid from within said mold to said chamber.

WILLIAM HAYES.

REFERENCES CITED

The following references are of record in the file of this patent:

UNITED STATES PATENTS

| Number | Name | Date |
| --- | --- | --- |
| 1,854,471 | Hofmann | Apr. 19, 1932 |
| 2,123,145 | Peiler | July 5, 1938 |
| 2,282,848 | Berthold | May 12, 1942 |
| 2,347,181 | Cox | Apr. 25, 1944 |
| 2,363,999 | Samuelson et al. | Nov. 28, 1944 |
| 2,382,028 | Samuelson et al. | Aug. 14, 1945 |
| 2,398,465 | Samuelson et al. | Apr. 16, 1946 |

FOREIGN PATENTS

| Number | Country | Date |
| --- | --- | --- |
| 310,421 | Great Britain | Feb. 27, 1930 |

Certificate of Correction

Patent No. 2,495,253 January 24, 1950

WILLIAM HAYES

It is hereby certified that errors appear in the printed specification of the above numbered patent requiring correction as follows:

Column 5, line 18, for the word "glow" read *blow*; column 6, lines 24 and 25, for "glowing" read *blowing*; line 42, for "direction" read *directing*;

and that the said Letters Patent should be read with these corrections therein that the same may conform to the record of the case in the Patent Office.

Signed and sealed this 9th day of May, A. D. 1950.

[SEAL]

THOMAS F. MURPHY,
*Assistant Commissioner of Patents.*